May 7, 1963  R. BACCHI  3,088,441
VALVE ACTUATOR
Filed July 11, 1960  3 Sheets-Sheet 1

INVENTOR.
Ray Bacchi
BY Lothrop & West
Attorneys

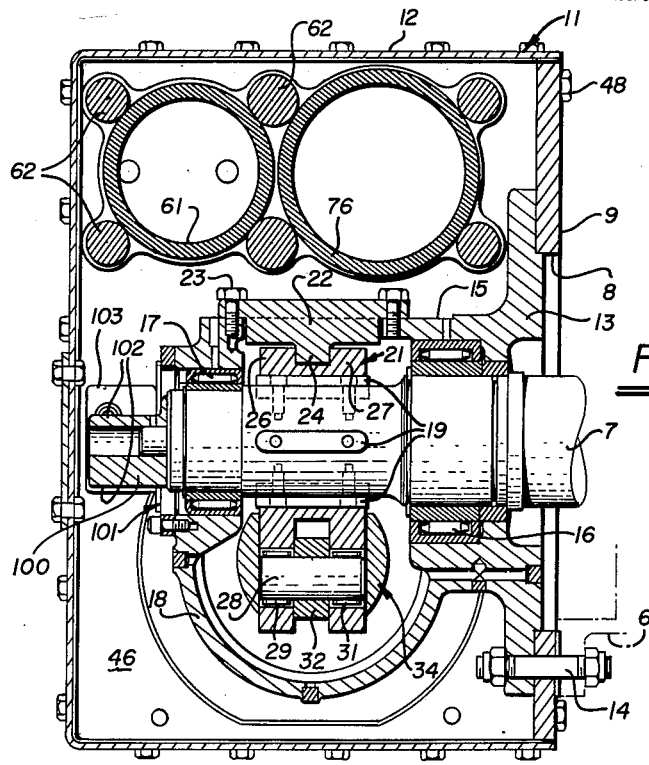

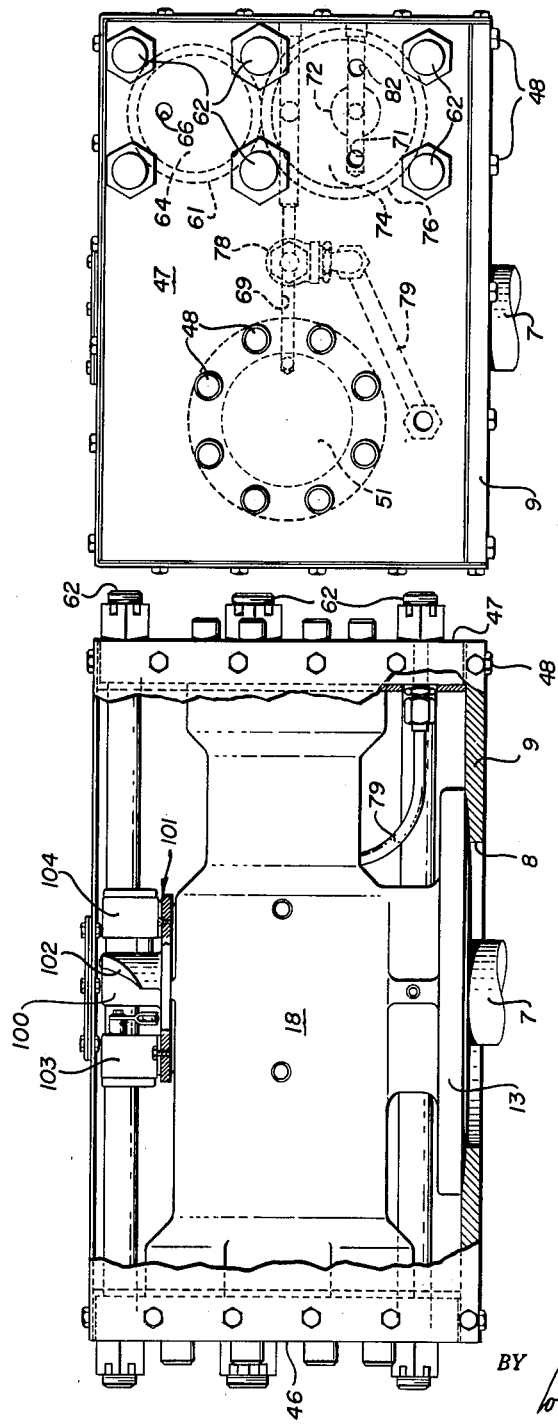

United States Patent Office 3,088,441
Patented May 7, 1963

3,088,441
VALVE ACTUATOR
Ray Bacchi, San Bruno, Calif., granted to the Administrator of the National Aeronautics and Space Administration on behalf of the United States, under the provisions of 42 U.S.C. 2457
Filed July 11, 1960, Ser. No. 42,022
3 Claims. (Cl. 121—38)

My invention relates generally to means for utilizing power to actuate a valve or comparable instrumentality, and is particularly concerned with an actuator utilizing compressed gas as a motor force. The actuator is effective to control a valve handling the flow of fluids under rather special conditions, such as unusually low temperature, or very high pressure or both, and is more particularly concerned with a valve actuator capable of effecting not only positive and quick movement of a valve but also controlled movement as to opening and closing rate.

In handling of fluids which are now termed exotic, such as liquid oxygen or comparable fluids especially utilized in rocket and similar environments, it is required that very large flows of fluid, for example, the flow through an eighteen inch pipeline or larger, be controlled within a very short interval of time. Further, the control not only must be accomplished within the indicated time but also the valve must open or close at a selected rate or rates during the allowed time. It is also important that the valve functioning be quite reliable, even under adverse conditions.

It is therefore an object of the invention to provide a valve actuator effective to move at a controlled rate or rates and within a very short interval of time to control a relatively large flow of fluid.

Another object of the invention is to provide a valve actuator which is so constructed that it can be utilized with the rotating stem of any sort of valve.

Another object of the invention is to provide a valve actuator which will function appropriately, utilizing a compressed gas as the power source.

Another object of the invention is to provide a valve actuator having sufficient energy to move to closed position even though the normal power source fails.

A still further object of the invention is to provide a valve actuator which is generally an improvement over actuators heretofore available.

Other objects of the invention, together with the foregoing, have been attained in the embodiment of the invention described in the accompanying description and illustrated in the accompanying drawings, in which:

FIGURE 2 is a cross section, the general plane of which is indicated by the line 2—2 of FIGURE 1, certain parts being shown in cross section on more favorable planes.

FIGURE 3 is a side elevation of the structure shown in FIGURE 1, a part of the housing being removed to disclose the interior construction and certain parts being shown in cross section.

FIGURE 4 is an end elevation of the housing of the valve actuator.

FIGURE 5 is a diagram showing schematically the general layout of the valve actuator with some of the fluid circuits therefor.

Figure 1:
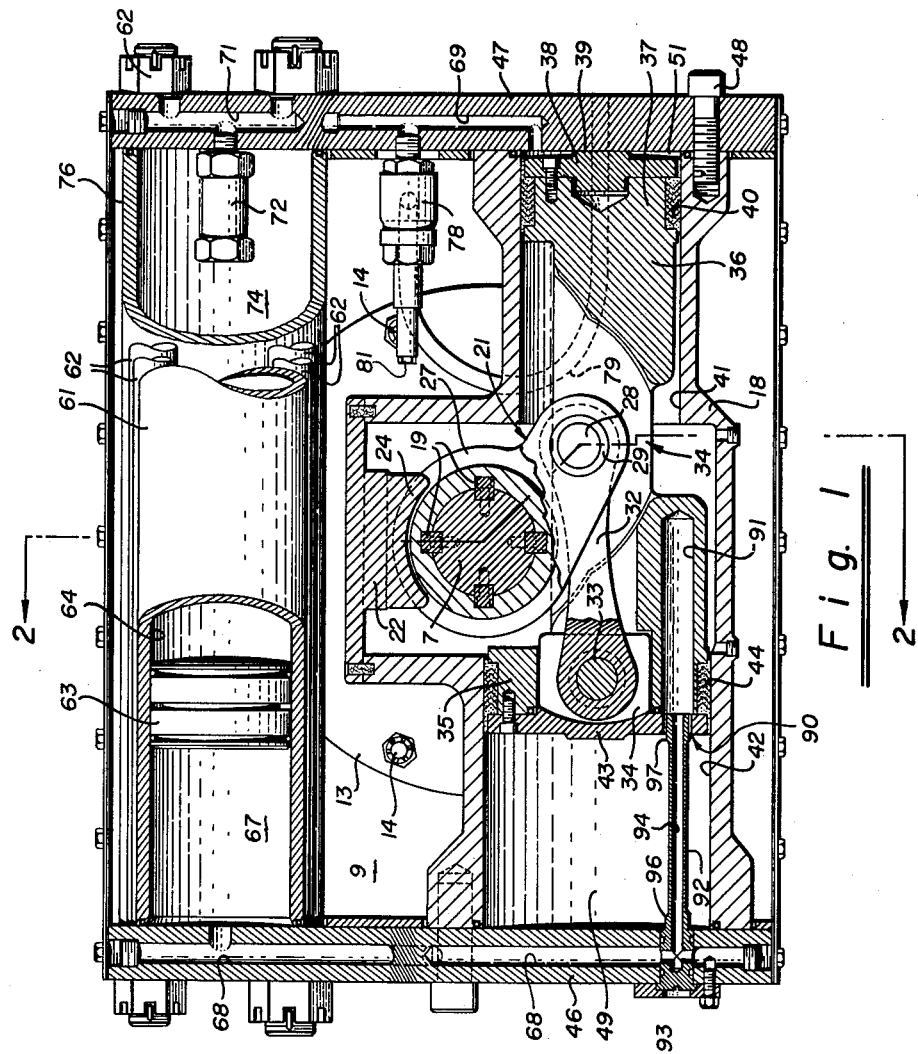
FIGURE 1 is in general a cross section on a plurality of planes normal to the valve stem and showing the general layout of the actuator, certain parts being broken away.

While the valve actuator pursuant to the invention can be embodied in a number of different ways, especially depending upon the particular operating environment, it has satisfactorily been made as shown herein for rotating a ball valve or spherical valve requiring a ninety degree turn to control the flow of liquid oxygen. The ball valve referred to has a free flow passage approximately eighteen inches inches in diameter, and the actuator is energized by nitrogen gas under pressure.

As especially shown in FIGURE 2, the valve itself is represented by part of a valve casing 6 and by an actuating stem 7 or shaft. The stem 7 extends from the casing 6 through an opening 8 in a base plate 9, forming part of an actuator housing 11 also including a cover 12. Secured to the base plate 9 is a frame structure 13 fastened to the base plate 9 by suitable bolts 14. The frame 13 has a hub 15 and within the hub is disposed a bearing 16 for locating the stem 7. In alignment with the bearing 16 is a similar bearing 17 engaging the stem 7. The bearing 17 is itself mounted in a portion of the frame 13 constituting an extension of the hub 15.

Mounted on the stem 7 by a plurality of keys 19 is a lever 21. The mounting is such that the lever 21 is free to move axially relative to the stem 7. There is restraint on the lever with respect to the hub 15 and the base plate 9. This is accomplished by means of a key plate 22 secured to the frame 13 by fastenings 23 and having a projecting key or feather 24 which is slidably received between shoulders 26 and 27 on the lever boss. Variations in length of the stem 7 due to different temperature conditions do not cause binding and do not affect the rotary position or rotational operation of the lever 21. Conversely, various changes in the axial position of the casing 6 or frame 13 which also change the axial position of the lever 21 do not affect the rotary position of the stem 7. There is consequently no chance for a binding or extra frictional resistance due to a rigid interconnection between the lever and the stem.

The lever is preferably bifurcated to receive a connecting pin 28 received in bearings 29 and 31, and also passing through one end of a link 32. The other end of the link has a pin connection 33 to a piston body 34.

The piston body 34 is substantially a continuous member connected to and including a large piston 35 and a small piston 36. The intermediate portion of the piston body passes over the ends of the pin 28 (FIGURE 2) and retains the pin 28 in most positions of the structure. The small piston 36 is provided with a piston head 37, capped by a disc 38 having a central stop 39. The disc 38 retains a chevron-wise packing 40 running against the walls of a small cylinder 41 within the frame 13. The frame 13 also provides a large cylinder 42 within which the piston 35 reciprocates. A plate cap 43 holds the packing 40 in position.

The cylinders 41 and 42 are closed by a pair of rigid end plates 46 and 47 secured to the base plate 9 and secured to the frame 13 by fastenings 48. When pressure fluid is admitted to the chamber 49 between the end plate 46 and the large piston 35, the piston body 34 and the link 32 are moved toward the right in FIGURE 1. This rotates the stem 7 toward open position. When pressure fluid is admitted to the chamber 51 between the end plate 47 and the small piston 36, that piston as well as the piston 35 are translated to the left, in FIGURE 1, and so move the link 32 and the stem 7 in such a direction as to close the connected valve.

Pursuant to the invention, it is desired to actuate the device directly or indirectly by gas, such as nitrogen under pressure, but it is also desired to effectuate a closer regulation of the piston and valve movement than is normally possible with elastic fluid. Consequently, there is employed a combination of gas under pressure as the actuating force and hydraulic or liquid circuitry for close control. To that end, between the plates 46 and 47 there is disposed a cylinder 61. Both ends of the cylinder are held sealed and in tight abutting position against the end plates by means of adjacent stay bolts 62. Within the cylinder 61 there is disposed a free piston 63, on one side exposed to the pressure of nitrogen gas conducted to the chamber 64 through a conduit 66 extending to a suitable source. On the other side of the free piston 63, the chamber 67 is filled with hydraulic fluid, such as non-flammable oil. A conduit 68 affords a connection between the chamber 67 and the large cylinder 42.

When high pressure gas is supplied to the chamber 64, the free piston 63 is translated to the left, in FIGURE 1, and displaces the hydraulic fluid through the conduit 68 into the large cylinder 42. The large area exposed to hydraulic pressure results in a force great enough to overcome any counter force and so translates the piston body 34 to the right and the valve is moved toward open position.

At all times, even during opening movement of the valve, nitrogen gas under high pressure from the source is directly conducted to the chamber 51 between the disc 38 and the plate 47 through a conduit 69, but the small area subjected thereto affords only a relatively small force. When the chamber 64 is exhausted to remove the superior opening force, the steady pressure exerted in the chamber 51 restores the piston body 34 to the other end of the cylinders and closes the valve. The restoration of the piston 35 to valve closed position displaces hydraulic fluid from the large cylinder 42 through the conduit 68 into the chamber 67 and so displaces the free piston 63 toward the right, in FIGURE 1, restoring the free piston to its original location.

The circuitry for causing and controlling the indicated motions is substantially as shown in FIGURE 5. A conduit 71 extends from a suitable source of gaseous nitrogen under pressure (not shown). From the conduit 71 the gas can flow through a check valve 72 (FIGURES 1 and 5) into a nitrogen accumulator 74. Conveniently, the nitrogen accumulator includes a relatively large tube 76 disposed immediately below the cylinder 61 and clamped between the end plates 46 and 47 by some of the stay bolts 62 so that a tight enclosure is made. Access to the accumulator through the conduit 71 is preferably in the form of a duct drilled in the plate 47. The check valve 72 is preferably located within the confines of the tube 76. The conduit 69 connected to the chamber 51 extends to the accumulator 74. Also communicating with the conduit 69 is a pressure relief valve 78 having a discharge duct 79 leading to the atmosphere. The relief valve 78 is conveniently provided with an adjustment 81 (FIGURE 1) located within the confines of the casing 6 so that, while it can readily be adjusted or set, it cannot be easily tampered with.

The inlet conduit 71 has a branch conduit 82 leading to a three way valve 83 (FIGURE 5). This valve is so designed that in one position it connects the conduit 82 directly and solely with the conduit 66, whereas in another position the three way valve disconnects the conduits 82 and 66 from each other and connects the conduit 66 to a drain or discharge conduit 84 leading to the atmosphere.

In the operation of this circuitry, the fluid under pressure from the inlet conduit 71 travels past the check valve 72 to the nitrogen accumulator 74 and travel from the accumulator through the conduit 69 to the chamber 51, which is therefore always subject to force from the high pressure gas supply in the accumulator. So long as the pressure is below a set upper limit, the relief valve 78 remains closed. When the three way valve 83 is in a position which connects the chamber 64 directly to the drain 84 while isolating the conduit 82 therefrom, there is only a low or exhaust pressure effective upon the piston 35. Thus the pressure always exerted within the chamber 51 is effective without substantial resistance to displace the pistons 36 and 35 to the left, in FIGURES 1 and 5. This motion closes the main valve. At the same time the hydraulic liquid is displaced by the piston 35 to move the free piston 63 toward the right and to discharge any remaining nitrogen within the chamber 64 through the valve 83 to the atmosphere.

In order to cause the main valve to close at any time, it is merely necessary to turn the three way valve to isolate the conduit 82 from the conduit 66 and to release the nitrogen from the cylinder 61 to the atmosphere. The pressure continually exerted by the gas on the small piston 36 produces the desired closing movement. In the event there should be a drop in or failure of pressure from the supply conduit 71, the check valve 72 immediately closes when the pressure within the conduit 71 is less than that in the accumulator 74. The accumulator gas is thus reserved under pressure. The closing stroke can nevertheless always be accomplished under these circumstances by the pressure of the quantity of nitrogen retained in the accumulator 74.

For normal opening of the valve, the three way valve 83 is turned to isolate the drain conduit 84 and to connect the pressure conduit 71 through the conduit 82 to the conduit 66. The full pressure then is exerted on the piston 63 urging the piston toward the left in FIGURES 1 and 5. The same unit pressure is exerted through the conduit 69 on the piston 36 and simultaneously through the hydraulic fluid on the piston 35 also. But the area of the large piston 35 is so much greater than that of the small piston 36 that the free piston 63 can translate to the left and the hydraulic displacement moves the valve stem 7 to open position, while nitrogen displaced into the conduit 69 from the chamber 51 is exhausted to atmosphere through the excess pressure relief valve 78.

In order to control the movement of the valve stem as desired, the hydraulic flow through the conduit 68, both to and from the cylinder 42, is restrained in a predetermined way. The body 34 and the piston 35 are provided with an axial recess 91. Extending through the face of the piston plate cap 43 and opening into the recess 91 is an orifice 90. Within the recess 91 there is disposed a tube 92 extending from a fastening 93 on the end plate 46. A central bore 94 extends for virtually the full length of the tube 92 and opens to the conduit 68, as well as into the recess 91. The outer contour of the tube is preferably provided with suitable enlargements such as 96 and 97. These are designed to fit more or less closely within the wall of the orifice 90 and to have a large clearance with the wall of the recess 91. The actual dimensions involved are relatively small and do not show to scale in the drawings. It will be understood that there is always some clearance between the enlargements 96 and 97 and the walls of the orifice 90 and a great deal of clearance between the enlargements and the surrounding interior surface of the recess 91. The hydraulic flow area at any one time varies in accordance with the position of the tube 92 within the orifice 90; that is, in accordance with the position of the piston 35 within the cylinder 42.

When the valve stem 7 is near its extreme positions, the rate of flow of the hydraulic fluid is throttled between the enlargements 96 and 97 and the boundary of the orifice 90 to insure that the gas pressure tending to open or to close the valve does not produce excessive movement or does not slam the valve mechanism, but does move the valve at the desired rate. The movement of the valve in the central range is usually not critical and hence considerably more clearance for fluid flow is allowed. Under certain circumstances, however, projections acting as orifice restrictions are made on the outside surface of the tube 92 at whatever selected portions in its length are necessary to produce the desired valve motion. The tube 92 is made easily removable and changeable, and is finally contoured at installation in order to provide precisely the desired motion of the valve stem.

The valve actuator, pursuant to the invention, is effective to utilize gas under pressure to produce a controlled motion of the valve. Even though the main source of pressure may fail there is still sufficient accumulator pressure gas available to make a closure of the valve. It is never possible to open the valve with the accumulator pressure, but it is always possible to close the valve as an emergency operation.

For many installations, there may be auxiliary controls or indicators to be actuated in accordance with valve position. For that reason, the hub 15 is provided with a removable mounting plate 101 (FIG. 2) and there is an extension 100 mounted on and fastened to the stem for rotation therewith. The extension 100 has certain cam contours 102 (FIG. 3) which come into engagement in different valve positions with one electrical switch 103 or another electrical switch 104 suitably mounted on the plate 101. The switches are connected in the usual way with indicators or other control instrumentalities, so that the particular position of the valve stem can be indicated as desired.

The valve actuator pursuant to this invention not only operates directly and quickly under ordinary and emergency conditions, but is a self-contained unit incorporating many of the conduits. Units subject to high pressure, such as the nitrogen accumulator 74, the gas-hydraulic cylinder 61, and the two actuating cylinders, are closed by the two end plates connected by substantial stay bolts so that operation at quite high pressures is satisfactory.

What is claimed is:

1. A valve actuator comprising a base plate, a hub on said base plate, a valve stem journalled in said hub, a lever on said valve stem, a pair of aligned cylinders, means connecting said cylinders to said base plate, a pair of connected pistons reciprocable in said cylinders, a link connecting said pistons and said lever, a tube, a free piston reciprocable in said tube, means for closing the opposite ends of said cylinders and of said tube, first means for establishing communication between one end of said tube and one of said cylinders, second means for establishing free communication between the other end of said tube and the other of said cylinders, means for subjecting said second means to pressure fluid, and means for restricting said communication through said first means in accordance with the position of said valve stem relative to said base plate.

2. A valve actuator comprising a base plate, a hub on said base plate, a valve stem journalled in said hub, a pair of aligned cylinders, means connecting said cylinders to said base plate, a pair of connected pistons reciprocable in said cylinders, a lever, means for mounting said lever on said valve stem for relative axial motion therebetween but against relative rotation therebetween, a link connecting said pistons and said lever, a tube, means for securing said tube to said base plate, a free piston in said tube, means for hydraulically interconnecting said tube on one side of said free piston and one of said cylinders, and means for simultaneously subjecting said tube on the other side of said free piston and said other of said cylinders to gas pressure.

3. A valve actuator comprising a base plate, a pair of aligned cylinders of different diameter, a tube, a pair of end plates closing the ends of said cylinders and said tube, pistons in said cylinders, a valve stem extending through said base plate, a lever secured to said valve stem, a link connected to said pistons and said lever, a free piston in said tube, means for hydraulically interconnecting said tube on one side of said free piston and the larger one of said cylinders, and means for simultaneously subjecting said tube on the other side of said free piston and the smaller of said cylinders to gas pressure.

References Cited in the file of this patent
UNITED STATES PATENTS

| | | |
|---|---|---|
| 2,674,138 | Mize | Apr. 6, 1954 |
| 2,808,811 | McLaughlin | Oct. 8, 1957 |